United States Patent [19]

Shimizu

[11] 4,132,451
[45] Jan. 2, 1979

[54] ANTI SKID CONTROL VALVE

[75] Inventor: Kazuaki Shimizu, Fujisawa, Japan

[73] Assignee: Nissan Motor Company, Limited, Japan

[21] Appl. No.: 825,849

[22] Filed: Aug. 18, 1977

[30] Foreign Application Priority Data

Aug. 21, 1976 [JP] Japan .................................. 51-99994

[51] Int. Cl.$^2$ .............................................. B60T 8/06
[52] U.S. Cl. ..................................... 303/116; 303/92; 303/115
[58] Field of Search .................... 188/181 A; 303/113, 303/92, 115–117, 119

[56] References Cited

U.S. PATENT DOCUMENTS

| 3,922,021 | 11/1975 | Every | 303/116 |
| 4,033,638 | 7/1977 | Bertone et al. | 303/116 |

Primary Examiner—Duane A. Reger

[57] ABSTRACT

A check valve is integrally formed on one end of an expansion valve slidably disposed in a first stepped bore and arranged to cut communication between the master cylinder and the brake units upon the pressure of the hydraulic fluid biasing the expansion valve to a first normal position being reduced due to either a signal from a computing circuit indicating a dangerously high rate of deceleration or cessation of the supply of pressurized hydraulic fluid. The movement of the expansion valve from its normal position permits the fluid in the brake units to pressure reducingly expand. A differential valve integrally connected to a by-pass valve maintains a fail safe pressure transmission path closed until cessation of the supply of pressurized fluid whereupon the master cylinder is directly connected with the brake units and a regulator valve slidably disposed in a third stepped bore formed in the by-pass valve is responsive to the change of both the master cylinder pressure and the supplied pressurized fluid to modulate the pressure biasing the expansion valve to its normal position.

11 Claims, 3 Drawing Figures

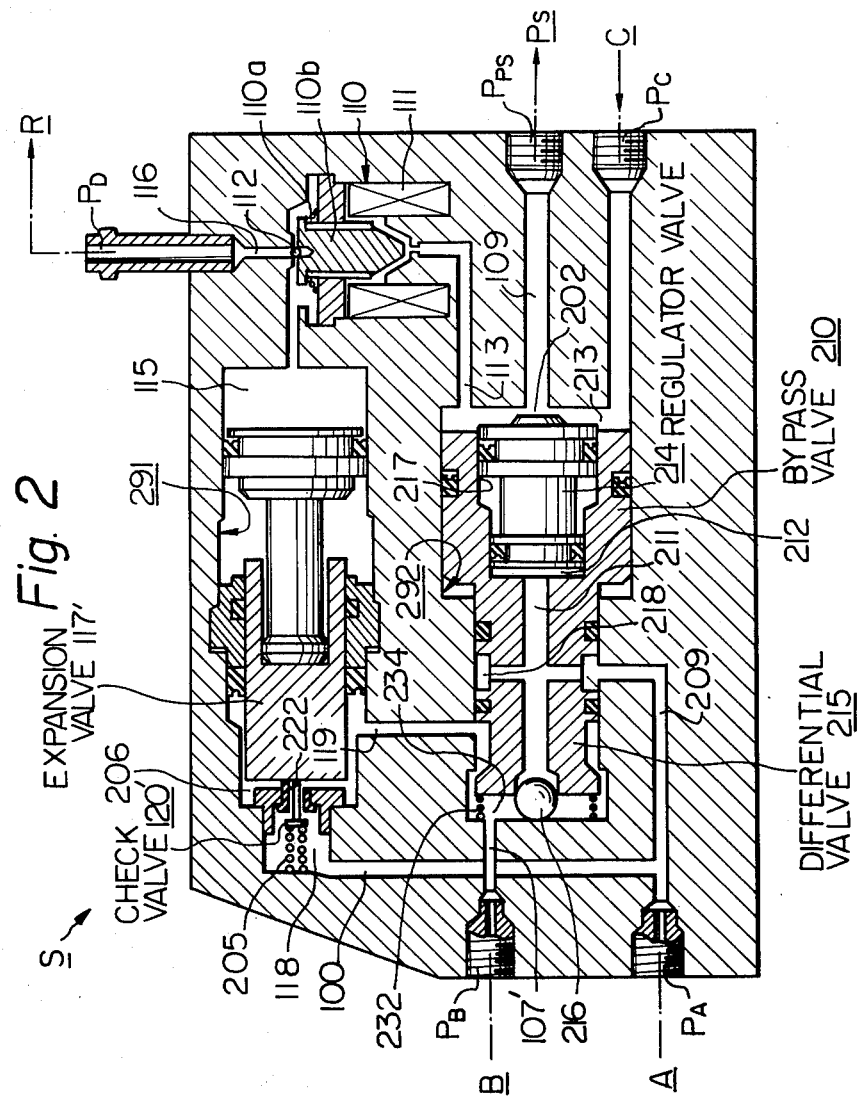

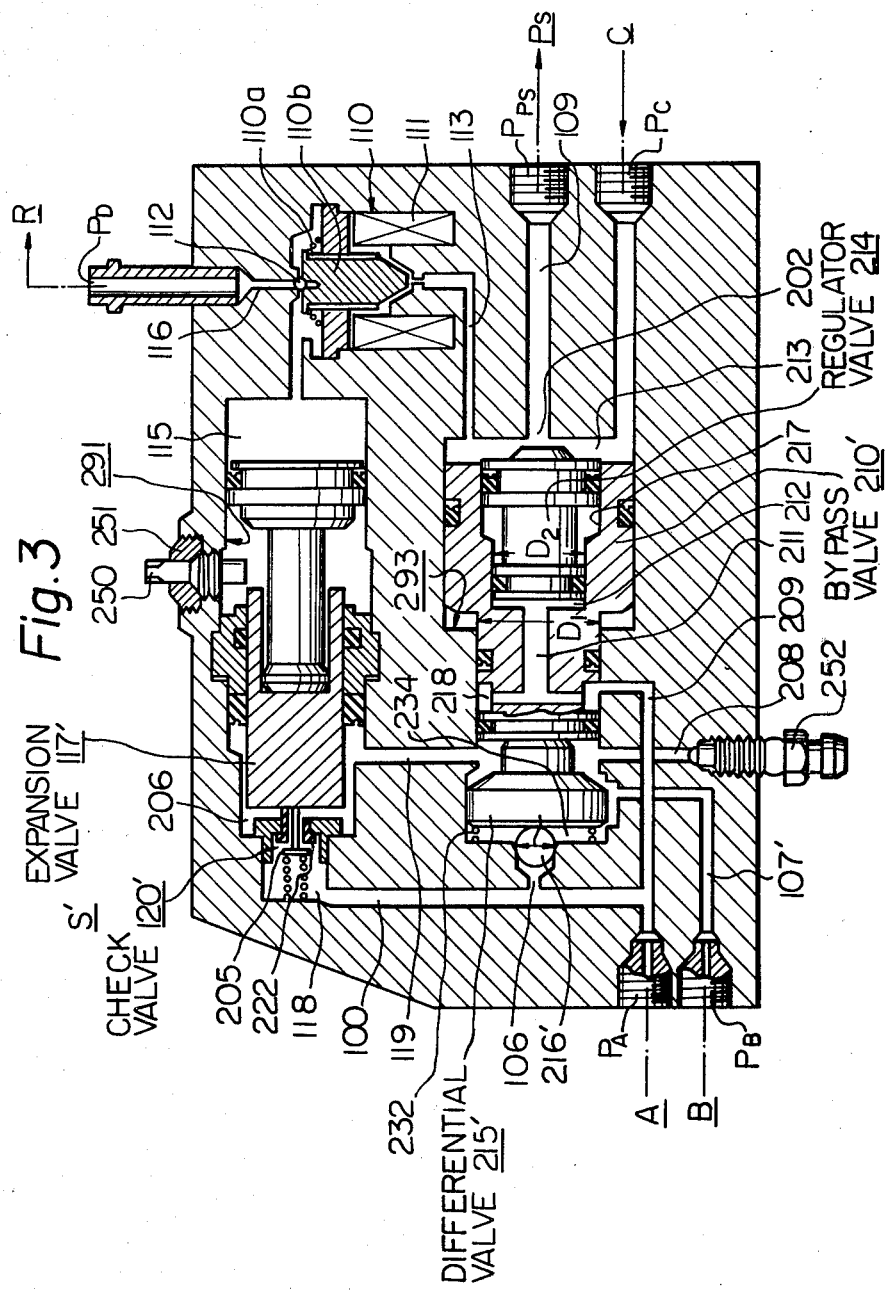

ANTI SKID CONTROL VALVE

BACKGROUND OF THE INVENTION

1. Field of the Invention

This invention relates to a hydraulic braking system for a motor vehicle and more particularly to an anti-skid unit incorporatable therein.

2. Description of the Prior Art

As is well known, it is desirable in view of the ever increasing performance capabilities of the modern motor vehicle to provide therein an anti-skid device or unit which will prevent excessive pressure being fed to the cylinders of the brake units during sudden deceleration and thus prevent dangerous wheel lock up and resulting skidding of the vehicle. This is particularly so in modern motor vehicles wherein efforts are being constantly made to reduce the overall weight and complexity of the vehicle components and thus the vehicle, so as to reduce the consumption of dwindling petroleum supplies.

One particular anti-skid unit is activatable by a computing circuit which temporarily cuts or severely limits the communication between the master cylinder of the braking system and the brake units and simultaneously expands the pressurized hydraulic pressure entrapped in the brake unit cylinders to reduce the braking effect generated thereby. This operation is repeatable to maintain the rate of deceleration below a predetermined safe level. However this unit has suffered from overcomplexity and excessive weight in that it uses three spool type valves or valve units slidably disposed in three separately formed stepped bores. The resulting conduiting required to interconnect the three bores presents many locations requiring sealing and is difficult to machine and produce during manufacture of same. Furthermore a rather large heavy bulky housing is required to house the three valve units thus incurring the aforementioned weight penalty.

SUMMARY OF THE INVENTION

Thus a control unit for an anti-skid system has been developed which solves the weight and size problems of the prior art in which three valve units are disposed in three separatedly stepped bores by disposing the third valve unit within one of the aforementioned valve units thus providing a unique arrangement whereby all of the drawbacks of the prior art are solved.

In detail a check valve is integrally formed on one end of an expansion valve slidably disposed in a first stepped bore and arranged to cut communication between the master cylinder and the brake units upon the pressure of the hydraulic fluid biasing the expansion valve to a first normal position being reduced due to either a signal from a computing circuit indicating a dangerously high rate of deceleration or cessation of the supply of pressurized hydraulic fluid. The movement of the expansion valve from its normal position permits the fluid in the brake units to pressure reducingly expand. A differential valve integrally connected to a by-pass valve maintains a fail safe pressure transmission path closed until cessation of the supply of pressurized fluid whereupon the master cylinder is directly connected with the brake units and a regulator valve slidably disposed in a third stepped bore formed in the by-pass valve is responsive to the change of both the master cylinder pressure and the supplied pressurized fluid to modulate the pressure biasing the expansion valve to its normal position.

Thus it is an object of the present invention to provide an anti-skid control unit which is light and compact.

It is another object of the present invention to provide an anti-skid control unit which is simple in construction and therefore easy to manufacture and assemble.

Another object of the present invention is to provide an anti-skid control unit which is formed with only two stepped bores within the housing of same thereby reducing the amount of conduiting interconnecting same to a minimum.

Yet another object of the present invention is to provide an anti-skid control unit which required the minimum amount of sealing members and therefore reduces the risk of hydraulic fluid leakage to a minimum.

It is yet another object of the present invention to provide an anti-skid control unit which demonstrates rapid response to changes in master cylinder pressure by providing a third valve unit which is slidably disposed in one of the two valve units which are respectively slidably disposed in the aforementioned two stepped bores.

It is yet another object of the present invention to provide an anti-skid control unit which in the case of pump failure or a similar malfunction causing a loss of pressurized hydraulic fluid, used as the source of motive power in the anti-skid control unit, the amount of pressure relaxation as a fail safe pressure transmission path is opened to replace a normal path is reduced to a minimum.

BRIEF DESCRIPTION OF THE DRAWINGS

Other features, objects and advantages will become more clearly understood as the description of the preferred embodiments proceeds taken in conjunction with the accompanying drawings in which:

FIG. 2 is a cross sectional view of a first preferred embodiment of a control unit for an anti-skid system according to the present invention; and FIG. 3 is a cross sectional view of a second preferred embodiment of a control unit for an anti-skid system according to the present invention.

FIG. 1 shows an example of a prior art anti-skid system incorporated into a braking system of a motor vehicle wherein the letters A, B, C, CC, PS and R represent the master cylinder; the wheel brake units (only one is shown); a source of hydraulic fluid under pressure such as a pump; a computing circuit which is fed various signals representative of various vehicle operating parameters such as rate of deceleration, vehicle speed, etc.; a power steering unit and a reservoir respectively.

Figure 1:
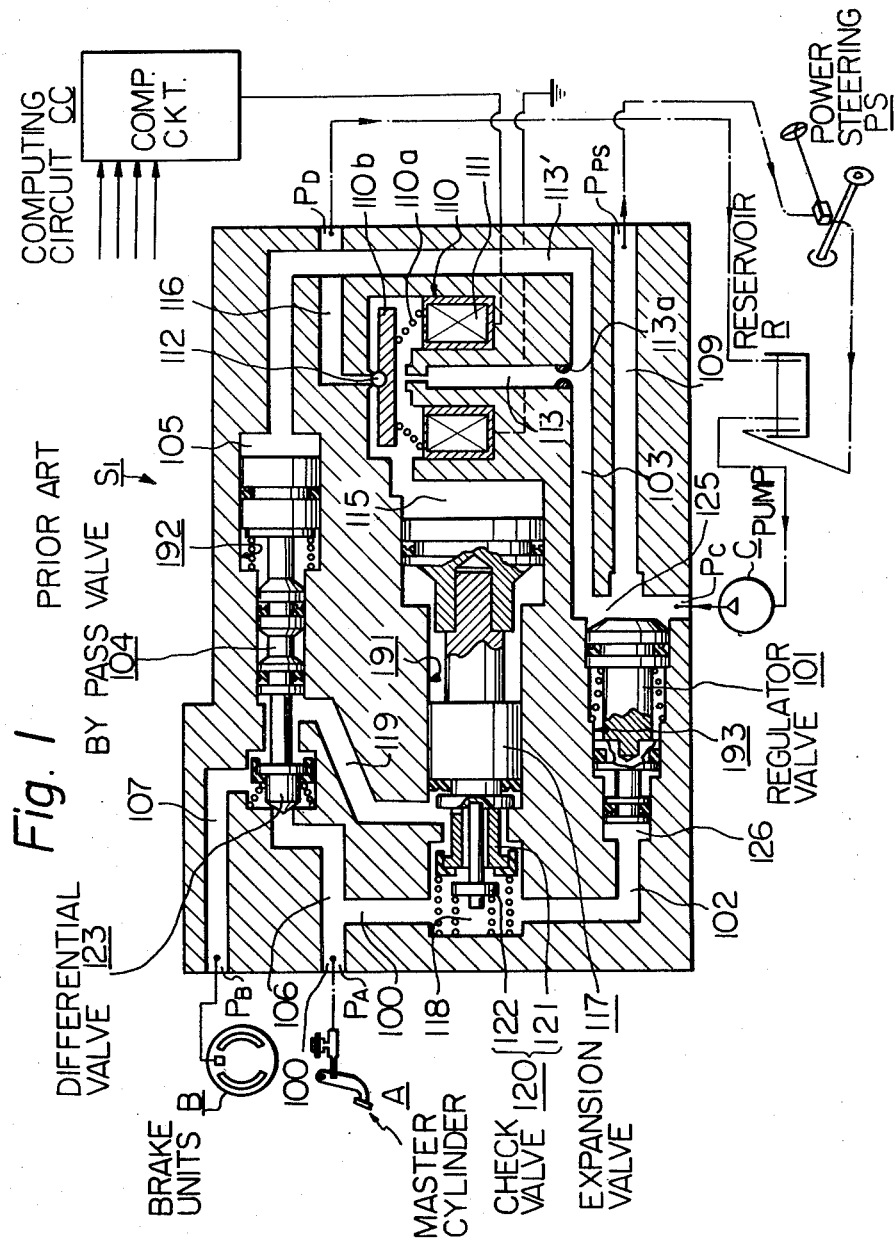
FIG. 1 is a cross sectional view of a prior art anti-skid control unit.

The above-mentioned computing circuit CC is arranged to issue an activation signal upon the rate of deceleration of the vehicle being sensed as exceeding a value which represents the upper limit of safe deceleration with respect to various road conditions such as inclination etc. A solenoid valve 110 is disposed within the control unit $S_1$ of the anti-skid system which upon receiving the activation signal from the computing circuit induces a situation therein where the pressure fed to the wheel brake units is temporarily reduced or relaxed to reduce the rate of deceleration and thereby reduce the risk of dangerous wheel lock up and subsequent skidding of the vehicle.

Now let us consider the construction and arrangement of the control unit and the components disposed therein in detail.

Formed within the control unit denoted by $S_1$ are three stepped bores 191, 192 and 193. Slidably disposed in the first bore is a first valve unit consisting of an expansion valve 117 and a check valve 120. As seen the check valve is a two stage type and consists of two members 121 and 122. The first member 121 is as shown fixedly connected to the expansion valve for integral movement therewith. The second member 122 is slidably arranged within the first. Two springs are arranged to bias the first and second members to the right as seen in the figure. Although shown in an open state for the purpose of illustration, the second member will normally be biased to a closed position under the effect of the spring abutting the end thereof. With this arrangement a two stage operation of the check valve is possible.

Slidably disposed in the second stepped bore 192 is a second valve unit consisting of a differential valve 123 and a by-pass valve 104. As in the case of the expansion valve and the check valve, these two valves are fixedly interconnected for simultaneously integral movement; and slidably disposed in the third stepped bore 193 is a third valve unit consisting of a regulator valve 101. The pump C is arranged to supply pressurized hydraulic fluid into the control unit through a port $P_C$. As shown the port $P_C$ fluidly communicates with chambers 105, 115 and 125 through conduits 113', 113 and 103. A conduit 109 is shown communicating with the chamber 125. This conduit is connected to a servo motor or the like which utilizes pressurized hydraulic fluid as a source of motive power. In this case, a power steering unit is shown fluidly connected to the pump via the aforementioned conduit 109.

The aforementioned solenoid valve 110 is shown interposed between the chamber 115 and the pump C. The valve consists of a solenoid coil 111, a conically shaped coil spring 110a, a disc like armature member 110b and a suitable sealing member 112 fixed to the armature 110b. The spring 110a is, as seen, arranged to bias the armature member to a position where it sealingly abuts the sealing member, in this case a ball shaped member, against an orifice which communicates a conduit 116 with the chamber 115. The other end of the conduit is arranged to constitute a port $P_D$ which in turn is communicated with the aforementioned reservoir R. Upon energization of the coil the armature is arranged to be attached downwardly (as seen in the drawings) to open the aforementioned orifice and close the orifice communicating the conduit 113 with the chamber 115. A restriction 113a is formed at the upstream end of the conduit 113. This is provided to limit the rate at which pressure can build in the chamber 115 thus providing smooth control of the expansion valve 117 which is movable via said pressure. As will be appreciated the pressurized fluid from the pump C is permitted to reach and enter the chambers 105, 115 and 125, and be transmitted to the power steering unit PS and or be returned from the chamber 115 to the reservoir R upon energization of the solenoid valve 110. The master cylinder A is arranged as shown to communicate freely with chambers 118 and 126 via conduits 100 and 102 and be communicable with a chamber 108 via the aforementioned differential valve 123 and a conduit 106. The latter conduit 106 is as seen branched off from the conduit 100. Two other conduits are shown formed in the control unit, namely conduit 119 and conduit 107. The first 119 is as shown arranged to interconnect chamber 108 and chamber 118 via the check valve 120. The second 107 is arranged to communicate the chamber 108 with the wheel brake units B via a port $P_B$.

The foregoing construction will be more clearly understood as the decription of the operation proceeds.

During normal operation with all components functioning correctly, and no braking of the vehicle being initiated, then the pressurized fluid supplied into the chambers 105, 115 and 125 will urge all three valve units, i.e., the bypass valve and integral differential valve, the expansion valve and the integral check valve and the regulator valve leftwardly as seen in the drawings due to the differential piston effect induced by the difference in diameter of the spools constituting the ends of the valves, e.g., since the diameter of the end of the by-pass valve 104 exposed to the chamber 105 is greater than that exposed to the chamber 108 then by suitable selection of the spring (no numeral) biasing the by-pass valve to the right as seen in the drawings the normal operating pressure supplied to the chamber 105 will urge the integrally connected differential valve into aboutment with an orifice which communicates the conduit 106 and the chamber 108 to cut communication therebetween. In the case of the expansion valve 117, the pressure from the pump acting on the surface area of the expansion valve exposed to the chamber 115 will bias the integrally connected expansion valve and check valve leftwardly to a position where the check valve permits free communication between conduit 100 and conduit 119, i.e., the biasing forces of the two springs abutting the first and second members of the check valve compete with the biasing force applied to the expansion valve by the pressurized hydraulic fluid in the chamber 115 and maintains the valve in a position intermediate of the two extremes of its possible travel. On the other hand, the regulator valve is arranged to be biased by a spring which is so selected that the normal pressure supplied to the port $P_D$ and the chamber 125 biases it completely to its extreme left position and thus permits full communication between port $P_D$ and the conduit 103.

Hence under the above described conditions when braking is initiated by the depression of the brake pedal, pressure is transmitted from the master cylinder to the cylinders of the wheel brake units via what shall be termed hereafter a first pressure transmission path, namely port $P_A$, conduit 100, chamber 118, past check valve 120, conduit 119, chamber 108, conduit 107 and finally port $P_B$ and to the brake units B, as they will be referred to hereinafter. This situation will continue until such time that the computing circuit senses a rate of deceleration greater than that appropriate for the situation whatever it may be.

If the computing circuit fails to issue a signal to the solenoid valve 110 then the as described unmodified connection between the master cylinder and the brake units will continue and normal braking will thus continue. However upon the computing circuit issuing a signal indicative of a dangerously high rate of deceleration then the armature 110b will be attracted from its home position by the energizing of the solenoid coil 111 to open the conduit 116 and close the conduit 113. Thus the pressure prevailing in the chamber 115 is permitted to fall to zero as the drain port $P_D$ is now freely communicated with the chamber 115. However at the same time as the rate of deceleration has increased, i.e., before the energization of the solenoid coil 111, the pressure prevailing in the chambers 118 and 126 increases due to the depression of the brake pedal. This induces a slight change in the positions of the expansion valve 117 and the regulator valve 101. The increased pressure will of course move the expansion valve so as to slightly reduce the communication between conduit 100 and conduit 119, by moving the integrally connected check valve 120 slightly to the right as seen in the drawings. The regulator valve will move so as to slightly reduce the degree of communication between the port $P_{PS}$ and the conduit 103 thereby slightly increasing the pressure prevailing in the chamber 105. However on the chamber being communicated with the drain port $P_D$, the expansion valve will be urged completely to the right as seen in the drawings moving the check valve to a position where very little communication between the conduit 100 and the conduit 119 is possible and simultaneously expanding the volume of the chamber defined within the portion of the stepped bore within which the expansion valve is slidably disposed, i.e., that chamber with which conduit 119 is freely communicable with and which is defined between the check valve and the expansion valve when the expansion valve has assumed the just described position. Thus due to the reduction of communication between conduits 100 and 119 and the increase in the volume of the aforementioned chamber (which is brought about by the movement of the expansion valve into the chamber 115) the pressure prevailing in the cylinders of the brake units will cease to increase and decrease respectively. Hence the braking force exerted by same will be accordingly decreased to prevent wheel lock up. Several repetition of this operation, i.e., pressure relaxation, normal operation, pressure relaxation may be necessary to ensure safe braking the number of which will be determined by the computing circuit CC.

Should the pump fail (malfunction), the engine stop a fan belt brake (assuming the pump is connected to the engine via the fan belt) and/or conduit interconnecting the pump and the control unit $S_1$ break or other cease to function properly so that the supply of pressurized fluid stops or is reduced then the regulator valve will be immediately biased toward and into the chamber 125 according to the change in pressure therein, whereby if some pressure is still supplied then that pressure will be directed to the chambers 105 and 115 and either cut off from, or sparingly supplied to the associated mechanism such as the power steering PS.

For ease of explanation let's assume that all pressure has disappeared and as a result all three valve units have been biased rightwardly by the master cylinder pressure and the forces of the associated springs. At this time a second pressure transmission path for the pressure from the master cylinder will be established namely conduit 100, conduit 106, chamber 108 and conduit 107 due to the closure of the check valve 120 and the opening of the differential valve 123. It will be noted that at this time no anti-skid action is possible, however the system is fail safe in that the second path is opened to provide restriction free connection between the master cylinder and the brake units.

FIG. 2 shows a first preferred embodiment of the present invention wherein the control unit S is formed with two stepped bores 291 and 292 therein.

Slidably disposed in the first bore is a first valve unit consisting of an expansion valve 117'. As shown the expansion valve has a check valve 120' fixedly connected to one end thereof. Slidably disposed in the second bore 292 is a second valve unit consisting of a by-pass valve 210 and a differential valve 215. As shown these two valves are integrally formed so as to define a single movable valve body and thus be coaxially aligned. Slidably disposed in a third stepped bore 217 formed within the by-pass valve is a regulator valve 214. As shown defined in the stepped bore 292 about the end of the differential valve 215 is a chamber 234 and defined in the same bore by the by-pass valve and the regulator valve housed therein is a chamber 213. As shown the chamber 213 is arranged to communicate with a port $P_C$ through which the pressurized hydraulic fluid from the pump C is fed. A conduit 109 opens into this chamber to permit the pressurized hydraulic fluid to either circulate to a suitable servo mechanism such as a power steering unit or simply drain back to the reservoir R for recirculation. In the case of the latter, a suitable flow restriction needs to be provided between the chamber 213 and the reservoir to maintain a suitable pressure within said chamber. The chamber 213 also communicates with a chamber 115 via a conduit 113 and a solenoid valve generally denoted by the numeral 110. The solenoid valve 110 consists of a solenoid coil 111, cone shaped coil spring 110a, an armature 110b and a sealing member 112 which is either formed integrally with or fixed, as seen in the drawing, to the top of the armature 110b. The spring 110a is arranged to normally bias the armature 110b so as to urge the sealing member (shown in the form of a ball) into sealing engagement with the orifice which provides communication between the chamber 115, conduit 116 and the port $P_D$.

The master cylinder A is arranged to fluidly communicate with chamber 118 and an annular chamber 218 formed in the outer periphery of the regulator valve 214 via conduits 100 and 209 respectively. The chamber 118 communicates with a chamber 206 via a check valve 120'. As shown the check valve is a single stage type comprising a combined valve stem and head 205 and a valve seat 222 formed of a suitable elastomer. As shown a through hole is formed in the valve seat 222 to communicate the annular space defined between the valve seat 222 and the valve stem with the chamber 206. A spring 205 is disposed so as to abut the valve head and bias the interconnected check valve and expansion valve in a rightward direction (as seen in the drawings). A conduit 119 is formed within the control unit so as to interconnect the chambers 206 with a chamber 234. The chamber 234 is as shown defined in the stepped bore 292 by the regulator valve 214 and has the differential valve 215 projected thereinto. A spring 232 is disposed in the chamber 234 and arranged to abut the end of the differential valve 215 so as to urge both the differential valve and the regulator valve (rightwardly as seen in the drawings) into the chamber 213. The chamber 234 is also arranged to communicate with the brake units through a conduit 107' and port $P_B$ and with the chamber 212 via a conduit 211 and a ball valve 216. As shown the conduit 211 is formed substantially along the common axis of both the differential valve and the by-pass valve, and is arranged to communicate with the annular chamber 218 via a bore (no numeral) formed through the regulator valve. A ball valve 216 is disposed in the orifice of the conduit 211 which opens into the chamber 234 to control the communication therebetween.

Now it will be noted that the diameter of the end of each of the expansion valve, by-pass valve and regulator valve exposed to the pressurized hydraulic pressure supplied into the control unit by the pump C is larger than the diameter of the corresponding end exposed to the pressurized fluid fed into the control unit by the master cylinder A. This of course produces a differential effect whereupon via suitable selection of the springs biasing the check valve 120' and the differential valve respectively toward the chambers 115 and 213, the pressure normally supplied into the control unit through port $P_C$ biases the expansion valve, by-pass valve and regulator valve leftwardly as seen in the drawings. In the case of the expansion valve 117', it will be biased to a position where equilibrium between the spring abutting the valve head of the check valve 120' and the pressure prevailing in the chamber 115 is established and the check valve 120' is maintained in a state wherein fluid communication between the chamber 118 and the chamber 206 is provided. In the case of the bypass valve 210, it will be biased to a position where the ball valve 216 is abutted against the end wall of the stepped bore 292 and the orifice formed at the end of the conduit 211. In this position the chamber 234 and the conduit 211 will be fluidly isolated.

Now as seen the differential valve 215 is formed with a chamfer which is arranged to be engageable with a step of the stepped bore 292 upon moving of the regulator valve toward and into the chamber 213 (or rightwardly as seen in the drawings) to cut communication between the conduit 119 and the conduit 107'.

In operation under normal trouble free conditions and with no braking of the vehicle being initiated the pressure fed into the chamber 213 from the pump C will maintain the two valve units (the first being the integrally formed expansion valve 117' and the check valve 120' and the second being the integrally formed by-pass valve 210 and differential valve 215 and the regulator valve 214 which is slidably housed in the by-pass valve 210) in the positions described in connection with the construction of this embodiment, i.e., biased to their effective leftmost positions (in the case of the expansion valve, its equilibrium position), Under these conditions the pressure from the pump C will be fed through conduits 113 and 109 to the solenoid valve 110 and the power steering unit PS respectively. It is of course understood that all of the fluid actually fed into the control unit is permitted to drain via the power steering unit and at this time only the pressure of fluid fed from the pump is transmitted to the chamber 115. The regulator valve 214 will be biased by this pressure fully into the bore in which it slidably received so as to permit the maximum possible communication between the chamber 213 and the conduit 109. It will be noted at this stage that the end of the regulator valve is formed with a projection which is arranged to, on approaching the orifice through which the conduit 109 opens into the chamber 213, reduce the possible communication therebetween and finally cut same. This particular feature will be described in more detail later in this disclosure.

With the expansion valve 117', differential valve 215, by-pass valve 210 and regulator valve 214 in their effective leftmost positions a first pressure transmission path will be established for the transmission of pressure from the master cylinder to the brake units B, which is namely: conduit 100, chamber 118, chamber 206, conduit 119, chamber 234 and conduit 107'.

Now upon pressing of the brake pedal to initiate deceleration of the vehicle, the pressure prevailing in the chambers which are fluidly communicated with the master cylinder A will rise. Hence the interconnected check valve 120' and the expansion valve 117 and the regulator valve 214 will be urged slightly rightwardly as seen in the drawings while the interconnected differential valve 215 and by-pass 210 remain stationary to maintain the ball valve 216 securely in a closed position. This induces a feedback phenomenon to occur within the control unit via the regulator valve 214 moving rightwardly as seen in the drawings with respect to the by-pass valve 210 in which it is slidably housed to increase the volume of the chamber 212 and to be thus urged into close proximity of the orifice via which the conduit 109 communicates with the chamber 213. This of course restricts the possible flow of pressurized hydraulic fluid therethrough and accordingly causes an increase in the pressure prevailing in the chamber 115. The expansion valve is thus urged leftwardly via this increased pressure back toward the position it assumed normal non-braking operation. Thus normal fluid communication between the chambers 118 and 206 is reestablished following the temporary restriction therebetween caused by the initial effect of the increase in the master cylinder pressure and the resulting slight closing of the check valve. Via this feedback operation, the first pressure transmission path is rapidly restored to normal and maintained substantially constant.

Now should the rate of deceleration of the vehicle exceed a level beyond which safe braking of the vehicle is not possible then the computing circuit will issue a signal to energize the solenoid coil 111. Upon energization of the coil 111, the armature 110b will be attracted so as to open the conduit 116 and close the conduit 113. This of course permits free communication between the chamber 115 and the drain port $P_D$. The pressure prevailing in the chamber 115 quickly drops to zero permitting the pressure in the chamber 206 to urge the expansion valve to its rightmost position. The check valve 120' is moved to a position cutting communication between the chambers 118 and 206. The first pressure transmission path is thus closed isolating the brake units B and the master cylinder A. Simultaneously the volume 206 is increased markedly whereby the pressurized fluid retained in the brake unit cylinders is permitted to expand thereinto to decrease the pressure prevailing in said cylinders. The braking effect inducing the aforementioned dangerous rate of deceleration is thus reduced to temporarily reduce the rate of deceleration. Several repetitions of this pressure relaxation may be necessary to induce and maintain the rate of deceleration of the vehicle at the maximum safe level. The frequency and number of said pressure relaxations will of course be decided by the computing circuit and will undoubtedly vary from situation to situation.

Now in the case the supply of pressurized hydraulic fluid ceases or is drastically reduced as a result of any one of a number of possible malfunctions such as pump malfunction, loss of mechanical connection between the motor driving the pump and the pump, rupturing of the conduit interconnecting the pump and the control unit, or the like then a second fail safe pressure transmission path will be opened, namely; conduit 209, annular chamber 218, conduit 211, ball valve 216, chamber 234 (part thereof) and conduit 107'. This is a result of the movement of both valve units to the right which is a direct consequence of the pressure in the chambers 115 and 213 falling to, or approaching zero whereupon the expansion valve 117' moves into the chamber 115 and the by-pass valve 210 moves into the chamber 213.

It will be noted that as the by-pass valve 210 moves to the right under the influence of both the master cylinder pressure and the biasing force of the spring 232, the chamfer formed on the differential valve will be urged into contact with the step (no numeral) adjacent same. The chamber 234 will thus be effectively divided into two sub chambers whereupon communication between the conduit 119 and the conduit 107' will be cut but fluid communication between conduits 211 and 107' established by the opening of the ball valve 216. It will be understood that the by-pass valve 210 is not permitted to move so far as to cut communication between the conduit 209 and the annular chamber 218 due to the aforementioned engagement of the chamfer and the step and most importantly that the latter mentioned engagement isolates the second pressure transmission path from the chamber 206 so that the increase in the volume of same due to the movement of the expansion valve toward the chamber 115 does not induce an anti skid type pressure relaxation during pump failure or the like. With this arrangement the master cylinder pressure is of course constantly supplied into the chamber 212 and conduit 211 irrespective of the pressure conditions within the control unit.

Hence it will be understood that the embodiment of the present invention just described is fail safe in the event of loss of the supply of pressurized hydraulic fluid, the just described second pressure transmission path being opened while the first is closed at two points, at the check valve 120' and by the abutting of the chamfer formed on the differential valve with the aforementioned step formed within the stepped bore 292. It will be further appreciated that under these conditions there will be no anti-skid operation by the control unit even if a signal from the computing circuit is fed to the solenoid coil thereof.

FIG. 3 shows a second preferred embodiment of the present invention which is similar to the afore described first preferred embodiment but which is equipped with a slightly different differential valve arrangement and has provision made for air entrapped within the hydraulic fluid employed in the master cylinder, the brake units and the control unit to be simply and easily bled off.

Since the arrangements of the expansion valve 117' check valve 126', by-pass valve 210' and the regulator valve 214 are basically the same as in the previous embodiment, no description of same will be given for brevity.

In this case the differential valve 215' is not fixedly connected to the by-pass valve 210' and is thus a separate unit which is arranged to be integrally movable therewith. A chamfer is formed thereon and arranged to sealingly abut a step formed in the stepped bore denoted in this case by the numeral 293. On abutment with the step the chamfer divides the chamber 234 effectively into two sub chambers and thus isolates the conduit 119 and conduit 107'. Thus in operation when a loss of pressurized fluid is experienced and the by-pass valve is urged into the chamber 213 by the force of the master cylinder pressure acting on the end thereof exposed to the chamber 234, the ball valve 216' will open the orifice communicating the conduit 106 and conduit 100 with said chamber 234. Hence a second pressure transmission path will be opened which is namely: conduit 209, conduit 100, conduit 106, chamber 234 and finally conduit 107'. As before the movement of the expansion valve into the chamber 115 cuts the first pressure transmission path which in this case is: conduit 209, conduit 100, chamber 118, check valve 120', chamber 206, conduit 119, chamber 234 and conduit 107'. It will be noted that this first path is cut at two places as before; at the check valve 120' and at chamber 234 by the abutment of the aforementioned chamfer and step to advantageously isolate the chamber 206 and the second transmission as previously described in connection with the first preferred embodiment. Once again a spring 232 is disposed in the chamber 234 and arranged to abut the end of the differential valve 215' to urge it and the by-pass valve 210' in the direction of the chamber 213. It will be also noted that the chamber 212 is not directly communicated with the ball valve and the chamber 234 in this case, this communication being replaced by the communication via conduits 106, 100 and 209.

Thus operation is as before; via a first pressure transmission path during normal operation with no braking, temporal cutting of the first pressure transmission path during anti-skid operation and use of the second pressure transmission path only during loss of supply of pressurized hydraulic fluid which ensures a fail safe direct connection between the master cylinder and the brake units.

Now a further feature is found in this embodiment and that is the provision for air bleeding. As shown an air bleed 252 is fluidly connected with the chamber 234 via a conduit 208. A lock member 250 is as shown screwed into a threaded bore formed through the body of the control unit and arranged to be extendable into the stepped bore 291 so as to prevent the movement of the expansion valve 117' in a rightward direction (as seen in the drawings). Thus with this arrangement when it is necessary to bleed the hydraulic braking system per se to eliminate any air entrapped therein, the motor should be started to activate the pump C and thus urge the expansion valve to the position as illustrated in FIG. 4. The locking member should be then screwed so as to project into the stepped bore 291. The motor should be stopped to permit the expansion valve 117' to move slightly toward the chamber 115 and thus abut the locking member 250. At this time despite the fact that the motor has stopped and all supply of pressurized hydraulic fluid has ceased accordingly, the expansion valve is maintained in a position which prevents cutting of the first pressure transmission path by the check valve. It is however cut by the movement of the by-pass valve into the chamber 213 which engages the chamfer on the differential valve with the step of the stepped bore as previously described. Hence if the air bleed 252 is opened at this time then air bleeding can be simply accomplished by pumping of the pedal operatively connected to the master cylinder to displace any air within the braking system. Upon completion of the air bleeding the air bleed should be closed and the locking member retracted via screwing of same to a position where interference with the expansion valve will not take place.

At this time it is considered appropriate to further clarify differential piston effect which is vital to provide the desired operation of the control units as described in connection with the second and third embodiment of the present invention. As seen in FIG. 4, the diameters of the end of the by-pass valve 210', the end of the regulator valve 214 exposed to the pressurized hydraulic fluid from the master cylinder and the diameter of the ball valve 216' are respectively $D_1$, $D_2$ and $D_3$. As will be appreciated by one skilled in the art by carefully selecting the ratio of $D_1:D_2:D_3$ in accordance with parameters such as the pressure supplied to the control unit by the pump C and the biasing effect of the spring 232 then the effect of the master cylinder pressure on the aforementioned two valve ends and the ball valve can be optimally selected.

What is claimed is:

1. An anti-skid unit for an automotive hydraulic braking system, said unit being equipped with a pump and a reservoir fluidly communicating with said pump, said unit comprising:

a first port;

a second port;

a first spool valve reciprocatively received in a first stepped bore to divide said first stepped bore into first and second portions, said first spool valve being movable between first and second positions and permitting fluid communication between said first and second ports via said first portion when in said first position, which interrupts said communication when in said second position thereof and which increases the volume of said first portion by moving from said first position to said second position, said first spool valve being biased toward said first position under the bias of the pressure of the hydraulic fluid supplied into said second portion from said pump and biased toward said second position under the bias of biasing means disposed in said first portion in the absence of said pressure;

a second spool valve reciprocatively received in a second stepped bore to divide said second stepped bore into first and second portions, which is movable between first and second positions, which permits fluid communication between said first port and second port via said first portion thereof when in said second position and which interrupts said communication when in said first position thereof;

a first passage having first and second portions, said first portion of said first passage extending between said first portion of said first stepped bore and said second portion of said second stepped bore and said second portion of said first passage extending between said first portion of said second stepped bore and said second port, said first portion of said first passage communicating with said second portion of said second stepped bore when said second spool valve is in said first position thereof and isolated therefrom when said second spool valve is in said second position thereof;

a second passage extending between said second portion of said first stepped bore and said second portion of said second stepped bore;

electromagnetic valve means disposed in said second passage for isolating said second portion of said first stepped bore and said pump and communicating said second portion of said first stepped bore with said reservoir when energized by an energizing signal; and a third spool valve reciprocatively received in a third stepped bore formed in said second spool valve, said third spool valve being so constructed and arranged to be responsive to small pressure changes at said first port to be movable within said third stepped bore to modulate the pressure of the hydraulic fluid introduced into said second portion of said second stepped bore from said pump to said second portion of said first stepped bore via said second passage.

2. An anti-skid unit for an automotive hydraulic braking system, said unit being equipped with a source of hydraulic fluid under pressure, comprising:

a first port;

a second port;

a third port;

a fourth port;

a fifth port;

a first valve unit reciprocatively received in a first stepped bore and movable between first and second positions, said first valve unit being arranged to define within said first stepped bore first, second, and third fluid chambers, said first chamber being arranged to communicate with said first port and further arranged to communicate with said second chamber when said first valve unit assumes said first position thereof and remain in fluid communication until isolated therefrom upon said first valve unit assuming said second position thereof;

said second chamber being arranged to be communicable with said second port and arranged to increase in volume upon said first valve unit moving from said first position to said second position thereof;

a second valve unit reciprocatively received in a second stepped bore and movable between first and second positions, said second valve unit being arranged to define within said second stepped bore, fourth, fifth and sixth fluid chambers, said fourth chamber being arranged to directly communicate with said third port and be communicable with said fourth port and said third chamber, said fifth chamber being arranged to communicate with said second chamber and said second port when said second valve unit assumes said first position thereof and isolated from said second chamber when said second valve unit assumes said second position, said sixth chamber being arranged to communicate with said first port and said first chamber;

electromagnetic valve means interposed between said third and fourth chambers for fluidly isolating said third and fourth chambers and communicating said third chamber with said fifth port when energized by an energizing signal; and a third valve unit reciprocatively received in a third stepped bore formed in said second valve unit, said third valve unit defining in said third stepped bore a seventh fluid chamber, said seventh chamber being directly communicated with said sixth chamber, said third valve unit being responsive to the pressure in said sixth chamber to reduce the communication between said fourth chamber and said fourth port in accordance with the increase of pressure in said sixth and seventh chambers.

3. An anti-skid unit as claimed in claim 2 wherein said first port is arranged to communicate with a master cylinder of said hydraulic braking system for the introduction of the master cylinder pressure from said master cylinder into said first and sixth chambers;

said second port is arranged to communicate with the hydraulic fluid cylinders of the brake units;

said third port being arranged to communicate with said source of hydraulic fluid under pressure;

said fourth port being arranged to communicate with reservoir means, the arrangement being that the communication between said fourth port and said reservoir means restricts the flow of hydraulic fluid therebetween; and said fifth port is arranged to communicate directly with said reservoir means.

4. An anti-skid unit as claimed in claim 3 wherein:
said source of fluid under pressure is a pump which is fluidly connected to said reservoir means; and
a power steering unit fluidly interposed between said fourth port and said reservoir means.

5. An anti-skid unit as claimed in claim 2 further comprising:
ball valve means disposed in said fifth chamber which is so constructed and arranged as to cut fluid communication between said fifth and sixth chambers when said second valve unit assumes said first normal position and permit fluid communication between said chambers when said second valve unit assumes said second position.

6. An anti-skid unit as claimed in claim 2 wherein said first valve unit is formed with a single action check valve on the end thereof, said check valve controlling said communication between said first and second chambers and comprising:
a shaft reciprocatably passed through an orifice formed in a partition formed between said first and second chambers;
spool means formed on the end of said shaft, said spool means being abutable with said partition upon said first valve unit assuming said second position to cut fluid communication between said first and second chambers;
said shaft being arranged to permit fluid communication thereover when said first valve unit assumes said first normal position; and
first biasing means disposed between said spool means and the end wall of said first chamber arranged to bias said check valve and thus said first valve unit in a direction which urges said spool means into abutment with said partition.

7. An anti-skid unit as claimed in claim 2 wherein the diameter of the end of said first valve unit exposed to said third chamber is larger than the diameter of the end of same exposed to said second chamber; and the diameter of the end of the second valve unit exposed to said fourth chamber is larger than the diameter of the end of same which is exposed to said fifth chamber;
the arrangement of the foregoing being such that the pressurized hydraulic fluid normally supplied into said fourth chamber and said third chamber urges said first and second valve units to their respective first normal positions.

8. An anti-skid unit as claimed in claim 3 wherein the diameter of the end of the third valve unit which is exposed to said fourth chamber is greater than the diameter of the end of same exposed to said seventh chamber.

9. An anti-skid unit as claimed in claim 2, further comprising:
ball valve means disposed in said fifth chamber which is so constructed and arranged as to interrupt fluid comminication between said fifth chamber and said first port when said second valve unit assumes said first position thereof and permit fluid communication between said first port and said fifth chamber when said second valve unit assumes said second position thereof.

10. In an anti-skid unit having a regulator valve for regulating a hydraulic fluid pressure from a source of pressurized hydraulic fluid, first and second parallel hydraulic paths disposed between a brake master cylinder and brake units;
an expansion valve which normally opens the first hydraulic path under the action of the fluid pressure regulated by the regulator valve and, when a pressure slackening signal is produced, closes the first path; and
a by-pass valve for opening the second hydraulic path only when a failure occurs in the hydraulic pressure source;
the anti-skid unit being characterized in that said regulator valve and said by-pass valve are arranged co-axially and that said regulator valve is slidably received in said by-pass valve.

11. An anti-skid unit as claimed in claim 10, characterized in that said regulator valve is subject at one end to a hydraulic fluid pressure fed from said source of pressurized hydraulic fluid and at the other end to a hydraulic fluid fed from said master cylinder through a passage defined in said by-pass valve, said regulator valve regulating the pressure from said source of pressurized fluid in accordance with the master cylinder pressure.

* * * * *